C. W. GLOVER.
STACKING AGRICULTURAL PRODUCTS.

No. 22,473. PATENTED DEC. 28, 1858.

UNITED STATES PATENT OFFICE.

CARLOS W. GLOVER, OF FARM RIDGE, ASSIGNOR TO HIMSELF, AND BRONSON MURRY AND J. VAN DOREN, OF LA SALLE COUNTY, ILLINOIS.

IMPROVEMENT IN STACKING AGRICULTURAL PRODUCTS.

Specification forming part of Letters Patent No. 22,473, dated December 28, 1858.

*To all whom it may concern:*

Be it known that I, CARLOS W. GLOVER, of the town of Farm Ridge, in the county La Salle and State of Illinois, have invented a new and improved mode of stacking grain and grass, or, rather, of forming shocks, cocks, and stacks of the stalks or straw of any agricultural products, whether the grain has been thrashed therefrom or not; and I do hereby declare that the following is a full and exact description thereof, reference being had to the accompanying drawings, and to the letters of reference marked thereon, in which—

Figure 1:
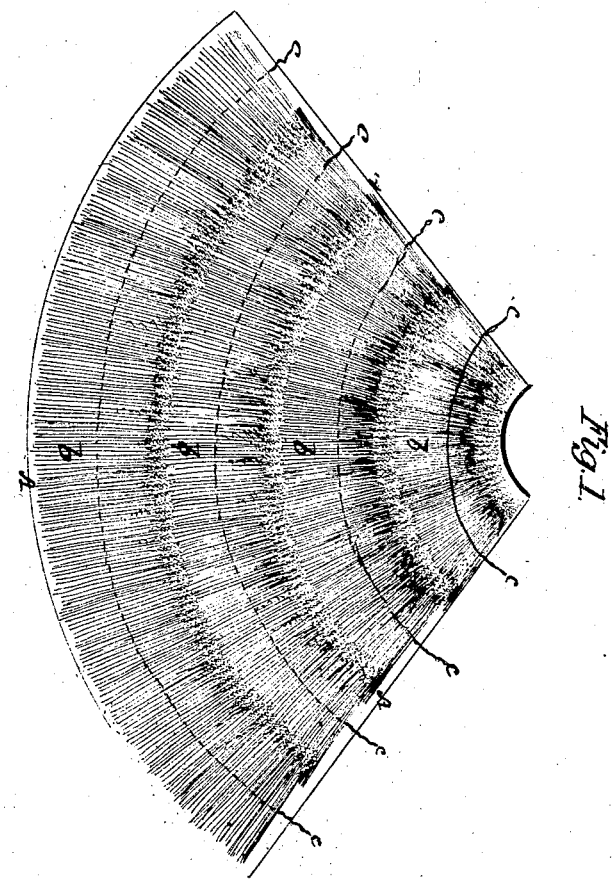
Figure 2:
Figure 3:
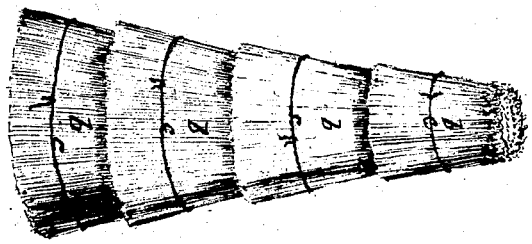

Figure 1 represents the material laid out on the apron or bands. Fig. 2 represents a vertical section through Fig. 1 and Fig. 3 represents the shape of the cock or stack when finished and set up.

I would state that I am aware that cocks, shocks, and stacks of grain and other material have been built up of a series of small previously-bound bundles and capped by the same, and that they have also been built up of loose straws or stalks and covered or thatched in various ways. I lay no claim to the making or building of any such cocks or stacks as are built up from the ground by piling up the material or setting or laying the bundles against or on top of each other. I do not form my stack on the ground. Neither do I build it or any part of it from the base to the apex, but directly the reverse, for I begin at the apex and build toward the base. I first form a bat or spread-out mat of two, three, four, or more lengths of straw, stalks, grain, or whatever is to be stacked up, each length overlapping or breaking joint with the previously-laid one, and then by rolling up or drawing together the edges of said mat and passing around a band or bands completing said stack. My spread-out mat bears the same relation to the finished stack which it is to form as a spread-out bat bears to the hat which it is to form. The entire substance of the finished thing is in the original blank or stock and merely requires form to perfect it.

My invention consists in forming a stack of any material out of two, three, four, or more lengths of the material which overlap or break joint with each other, the heads all pointing to a common center, and so arranged as that when the radial sides of the spread-out material are drawn together and bound a conical or pyramidal stack shall be formed.

To enable others skilled in the art to make and use my invention, I will proceed to describe the same with reference to the drawings.

Upon an apron, A, or upon cords or linked bands $c$ of any suitable flexible material, I lay a strata or row, $b$, of the material to be stacked, with the seed ends pointing toward a common center. Upon this first row I lay a second, third, and fourth, each with their seed ends pointing to the same center as the first one, but each row in succession receding from the apex or center toward the base, so that the butts of the first shall cover the panicles of the second row, and the second cover those of the third, and so on. The rows are thus built up on each other until sufficient is furnished to form the stack. If the apron has been used to build upon, the cords or whatever forms the bands should have been previously laid across said apron at suitable distances from each other. If the cords or any other sufficiently flexible bands are used without the apron, then they should have been previously laid out to form the mat upon. When the mat is laid up the apron or bands are drawn and tightly bound around the stack, and it may then be set up on end and it is completed.

That portion of the material that forms the interior of the stack need not be so carefully placed as that which forms the outer portion of it.

Having thus fully described my invention, what I claim therein as new, and desire to secure by Letters Patent, is—

Making a stack out of two, three, four, or more lengths of straw or other material that overlap or break joint with each other, and which are laid with their seed ends pointing to a common center, and commencing at the apex and ending at the base, and drawn together and secured, substantially as herein represented, using as a foundation to build upon an apron or the binding cords or chains, as set forth.

CARLOS W. GLOVER.

Witnesses:
A. G. FISHER,
THOS. ORTON.